Sept. 23, 1969 D. V. BET 3,469,252
INTEGRATED BAR GRAPH DISPLAY HAVING INTERRUPT CONTROL
Filed Feb. 6, 1967 4 Sheets-Sheet 2
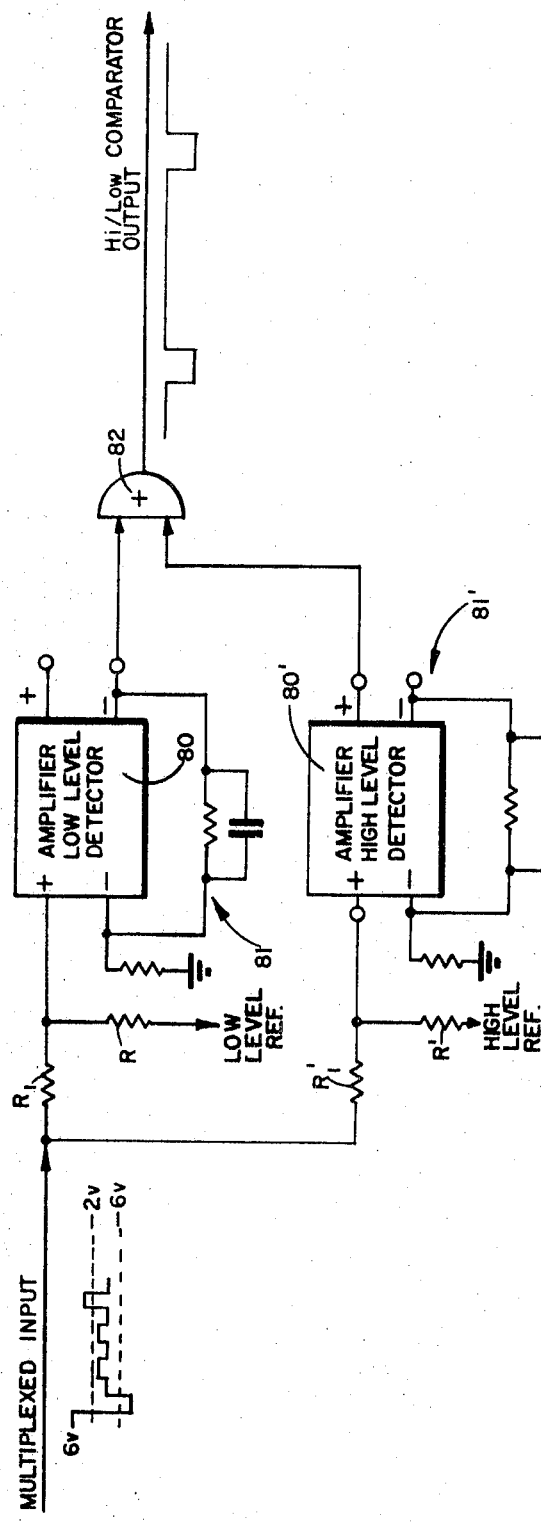
FIG. 8
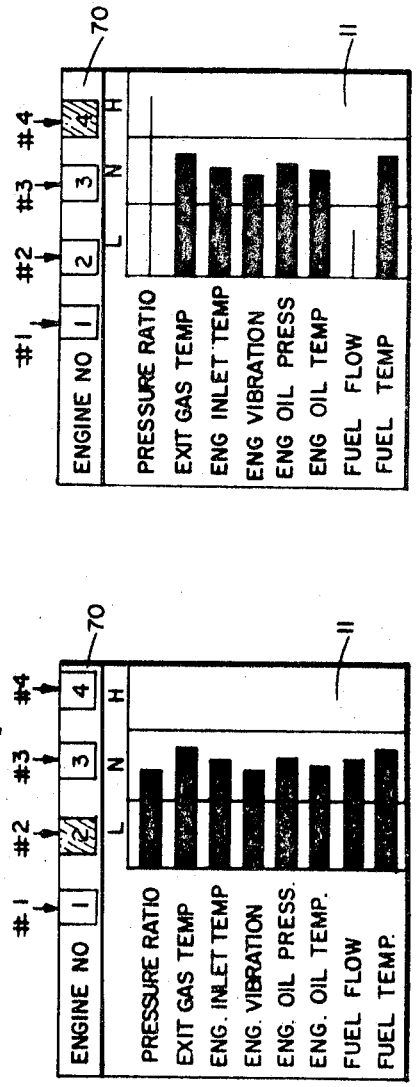
FIG. 3
FIG. 2
INVENTOR.
DONALD V. BET
BY
*Robert D Rogers*
ATTORNEY

INVENTOR.
DONALD V. BET
BY
ATTORNEY

United States Patent Office 3,469,252
Patented Sept. 23, 1969

3,469,252
INTEGRATED BAR GRAPH DISPLAY HAVING INTERRUPT CONTROL
Donald V. Bet, Los Alamitos, Calif., assignor to North American Rockwell Corporation
Filed Feb. 6, 1967, Ser. No. 614,129
Int. Cl. G08b 23/00
U.S. Cl. 340—324                                            5 Claims

ABSTRACT OF THE DISCLOSURE

A display system for sequentially displaying groups of monitored variables in one form indicating normal variables and in another form indicating an abnormal variable within the group being displayed. The system includes a control circuit for interrupting the normal processing of variables to a display for immediately displaying an abnormal variable under the control of a signal generated as a function of the abnormal variable. The variables are compared with reference quantities for determining abnormal variables before the variables being compared are processed to the display.

BACKGROUND OF THE INVENTION

Field of the invention

The invention relates to a system for developing sequential displays of linearized and normalized variables in a representative form proportional to the quantity of the variables, including control means for immediately displaying abnormal variables in a form different from the form of display for normal variables.

Description of prior art

The art which is described and distinguished in the following paragraphs, is believed to be the closest art relative to the invention. The patents referenced were selected from search results received in connection with the invention.

Patent No. 2,922,990, to R. A. Anderson for Data Reduction System, teaches a system for monitoring large numbers of variables for abnormal conditions and for printing out information representing normalized and linearized variables in a manner permitting viewing by an operator. The signals are compared with upper and lower limits stored in a drum memory to determine if an abnormal condition exists. If an abnormal condition exists, an alarm is given. The drum memory used in the system stores instruction as well as linearization information.

Patent No. 2,987,704, to D. J. Gimpel et al. for a Variable Monitoring and Recording Apparatus, teaches a system similar to the Anderson system wherein variables are monitored, linearized, normalized and recorded. The system scans variables at a higher rate than the data can be printed out. As the data is scanned, it is stored in a drum memory and subsequently printed out at a slower rate. If an abnormal condition is detected, it can be taken from the storage location and printed out immediately. The memory device also stores upper and lower limits, instructions and other control information for regulating the monitoring of data.

Patent No. 2,701,748, to R. A. Anderson for an Automatic Process Logging System, teaches means for periodically scanning large numbers of process variables including means for printing and arranging the process variable data on a typed out log sheet in a manner where the information can be quickly and efficiently reviewed by an operator. The abnormal variables are distinguished from the normal variables by printing the abnormal variables in different colored print.

Patent No. 3,240,990 to H. G. Blank et al. for a Display Device, teaches an integrated unit in which in a binary signal applied to a set of input terminals is displayed as a bar of light having a length proportional to the magnitude of the input signal. The device comprises a thin, flat, non-conducting substrate having an electroluminescent indicator forming one of its narrow edges. Circuitry for electrically coupling an applied digital input signal to the electroluminescent indicator is deposited on one surface of the substrate.

As indicated by prior art, the conventional approach to the design of variable monitoring and display systems has been to design a custom system for a particular application. If the number of variables or the application changes, the equipment must also be substantially changed. One of the objects of the stated patents was to design a system or systems which could be integrated with computer controls for providing greater flexibility, speed and reliability at a relatively low cost. By using a computer, instructions could be included along with stored information as to upper and lower variable limits and linearization information.

Although prior art computer controlled systems are flexible and easily modified, they are also complex and expensive. There is a need for a flexible system which is relatively simple and inexpensive. Such a system should provide a means for visually displaying variables in a repeating sequence. A capability should be included in the system for interrupting the normal processing of variables for immediately displaying an abnormal variable in a form which distinguishes it from a normal variable.

SUMMARY OF THE INVENTION

Briefly, the invention comprises means for generating displays representing the magnitudes, or quantities, of groups of variables. The displays are in a bar graph form having a displacement which is proportional to the magnitude of the variables. The variables are referenced to a common base (normalized) before being displayed and are linearized, if necessary. The system includes means for continuously comparing each variable with quantities representing high and low limits for the variables. If an abnormal variable is detected, it is referenced to a unit which includes at least one variable. In a preferred embodiment a unit may comprise a plurality of variables. By dividing the variables into units, or groups, more than one variable can be displayed simultaneously.

Logic is included for processing the variables from the input to the display. The processing logic divides the variables into units consistent in number to the units which are formed by the comparing means. The processing logic is gated by clock signals which have substantially slower rates than the rate at which the variables are compared and referenced to a display unit. As a result of the time differential between the operation of the processing logic and the comparing means, the variables can be compared at least once and any abnormal variables referenced to a unit before the variables are divided into units and gated through the processing logic.

The comparing means includes means for generating an interrupt control signal when an abnormal variable is detected for controlling the gating of variables through the processing logic. As a result, the unit in which the abnormal variable has been referenced is immediately gated to the display means.

The variables gated through the processing logic are also measured by a second comparator. When an abnormal variable is detected, a signal is generated during the time interval of the abnormal variable for changing the form of the display of the abnormal variable to a form different from that of a normal variable.

Therefore, it is an object of this invention to provide a relatively flexible and simple system for displaying monitored variables in a relatively fast, reliable and accurate manner without the necessity for complex computer controls.

A still further object of this invention is to provide a bar graph display system including controls for interrupting the normal processing of variables and for displaying abnormal variables out of sequence in a form different from that of a normal variable.

It is still a further object of this invention to provide an integrated, relatively simple and high speed system using a minimum of components for continuously processing variables sequentially to a bar graph display at one rate of speed while tests are made for abnormal variables at a substantially higher rate.

It is still another object of this invention to display pluralities of linearized and normalized variables in a repeating sequence including means for detecting abnormal variables and immediately displaying the abnormal variables in a form which is distinguishable from the form of normal variables.

These and other objects of this invention will become more apparent in connection with the following drawings.

BRIEF DESCRIPTION OF THE DRAWINGS

FIGURE 2 illustrates a typical bar graph display showing a plurality of normal variables.

FIGURE 3 illustrates a bar graph display showing a plurality of variables including abnormal variables.

FIGURE 8 illustrates one embodiment of a comparator circuit which can be used in the system as a high/low comparator.

DESCRIPTION OF THE PREFERRED EMBODIMENTS

Figure 1:
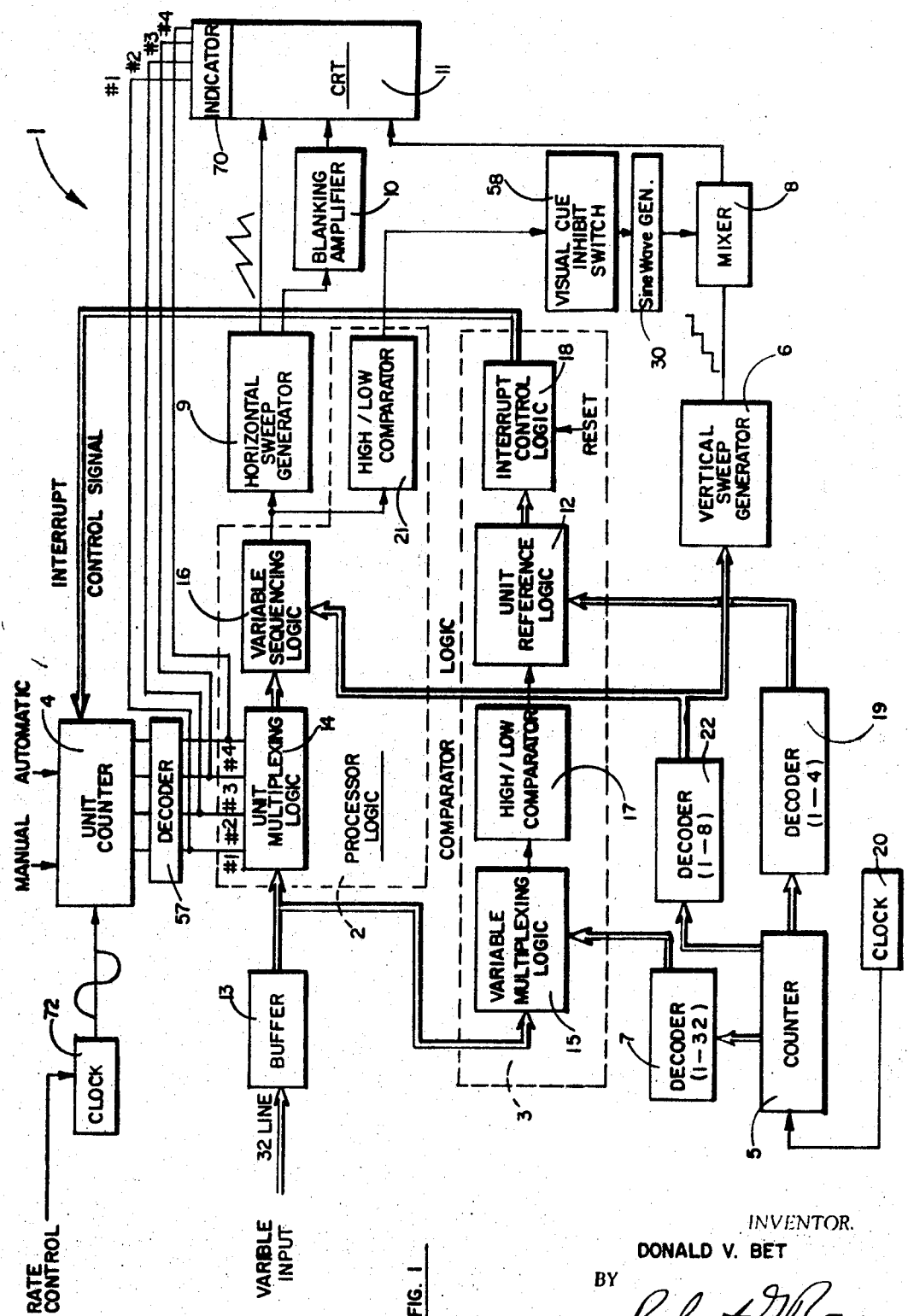
FIGURE 1 illustrates a block diagram of one embodiment of the test system.

Referring now to FIGURE 1, wherein is shown display system 1, including indicator means 11, such as a cathode ray tube, electroluminescent panel device, etc. The particular embodiment described and shown utilizes a cathode ray tube as an indicator.

Processor logic 2 and comparator logic 3 comprise the major portions of the system. Counting devices 4 and 5 with decoders 7, 22, 19 and 57 generate gating signals for regulating the system. Horizontal and vertical sweep generators 6 and 9, mixer 8, inhibit switch 58, blanking amplifier 10, and sinusoidal generator 30, produce the display on the cathode ray tube. Buffer means 13 is connected to the processor logic and to the comparator logic. The buffer may comprise a plurality of high input impedance devices for isolating the comparator and processor logic from the sources producing the variables. If loading effects are not a concern in a particular application, the buffer can be omitted.

The plurality of variable inputs to the buffer may be generated by transducers such as thermocouples, resistance thermometers, bellows controlled potentiometers, etc. and other devices well known in the art for sensing variables such as temperature, pressure, flow rates, vibration and other parameters. The variables are linearized, if necessary, and referenced to a common base so that the signals can be more easily processed by the system. In other words, if variables are normalized, a single high/low quantity range can be used in the system to test for abnormal variables. An abnormal variable would either be above or below the test quantity. Linearization and normalization of the variables are performed before the variables become inputs to the buffer. It is believed that circuitry for linearizing and normalizing is well known to those skilled in the art.

For the particular embodiment shown and described, thirty-two (32) variables are selected for processing. The variables are divided into four groups, or units, of eight (8) each for the display. In a particular application, a preliminary study may be required before undertaking to linearize or normalize the signals.

At the inputs, variables are represented by voltage levels proportional to the magnitude of the variables measured. When the variables are processed through the processor and comparator logic, the constant voltage levels are modified into signals having a discrete value and duration. The duration corresponds to the interval of a processing, or gating, signal.

The inputs are simultaneously connected through the buffer to Unit Multiplexing logic 14 and to variable multiplexing logic 15. Thirty-two (32) input conductors are connected to both logic groups from the buffer.

Multiplexing logic 14 may be mechanized by four groups of eight (8) AND gates and eight (8) OR gates to provide eight simultaneous outputs to variable sequencing logic 16. Each group of eight outputs comprises one of the four units of variables to be displayed in sequence by display means 11. The multiplexing logic 14 is connected to decoder 57 and to variable sequencer logic 16. Decoder 57 is connected to counter 4. Clock 72 is connected to the counter.

The decoder may comprise four AND gates connected to receive signals from the counter. The output from each gate identifies one of the four units of variables gated through the multiplexing logic. The connections between the decoder and the multiplexing logic are numbered one to four to indicate the number of units into which the variables are to be divided. Obviously, the number of units could be changed to adapt the system to a different application or to the same application with a different number of inputs.

The counter may comprise two R-S flip flops for counting four binary intervals. Gates could be included for controlling the counting sequence. The counter includes inputs designated as manual and automatic. When the counter is in an automatic mode, the count is increased and repeats automatically according to the clock 72 input. If the counter is in a manual mode, the count and therefore the display, are held until the manual input is changed.

The counter also receives interrupt control signals generated by the comparator logic. The interrupt signals, when received by the counter, are referenced to a particular unit or group of eight (8) variables. The counter is forced to assume the binary count which will gate the referenced unit of variables through the unit multiplexing logic.

The variable sequencing logic 16 is connected to the horizontal sweep generator 9 and to high/low comparator 21. It is also connected to receive input gating signals from decoder 22, and the variable inputs received from the multiplexing logic 14. The variable inputs, referenced to a unit, are received in parallel and are gated or multiplexed into the comparator and horizontal sweep generator under the control of the gating signals from decoder 22. The sequencing logic may be mechanized by eight AND gates having a common output connection to the horizontal sweep generator and the high/low comparator.

The horizontal sweep generator is connected to the cathode ray tube and to blanking amplifier 10. Both circuits are standard circuits for use with cathode ray tubes and for that reason are not described in detail. The output signal from the generator is a linear sweep or ramp having a fixed frequency. The amplitude of the ramp varies as a function of the level of the variables. The amplitude of the ramp signal controls the length of the horizontal display shown by the CRT. An example of the signal is shown at the output of the generator. The blanking amplifier controls the intensity of the displayed variable.

High/low comparator 21 is connected to inhibit switch 58. Multiplexed inputs received from the sequencing logic are individually compared with, or tested against, predetermined high and low limits. The limits are predetermined after a study of all the variables to be monitored. The variables are referenced to a common base such as a voltage level so that one set of limits can be used for all variables.

For example, the limits may be represented by high and low voltage levels. If a variable has a quantity, or magnitude, within the limits, it would be considered a normal variable. If a variable exceeds either one of the limits, it would be considered as abnormal and an output signal would be generated to the inhibit switch.

The comparator may comprise two direct coupled differential amplifiers biased so that one amplifier generates an output signal if the high limit is exceeded and the other amplifier generates an output signal if the low limit is exceeded. The outputs are connected together.

FIGURE 8 shows one embodiment of a circuit which may be used for comparing incoming signals with predetermined limits. Two such circuits must be provided for the system. The circuit comprises amplifier 80 for detecting input signals which are lower than the low test limit and amplifier 80' for detecting input signals which are higher than the high test limits. Resistors R and R' are connected to a source of low level reference voltage and to a source of high level reference voltage, respectively. Input resistors $R_1$ and $R_1'$ are also connected to the input terminals of the circuit. Feedback elements 81 and 81' comprise state of the art capacitor and resistor combinations for connecting positive feedback from the output to the input of each detector. Each amplifier is operating as a regenerative detector wherein the initial state of the output reverts to the opposite state when the signal threshold is exceeded.

The outputs are connected to OR gate 82. The output from the OR gate is connected either to the inhibit switch means or to the unit referencing logic 12.

For the embodiment shown, the circuit is assumed to be connected to the variable sequencing output. A representation of an input signal 83 is shown at the input. The signal is assumed to be a negative going signal representing eight variables. Normal voltage ranges arbitrarily selected to be minus two (−2) volts for the low limit and minus 6 (−6) for the high limit.

If the signal levels are within their normal range, the negative output of the low level detector is "false" or zero (0) volt. The positive output of the high level detector is also "false." When a variable within a selected unit is less than the low limit output of the low level detector, the output from that detector becomes "true." In a similar manner when a variable within a selected unit increases to a value greater than the high limit, the high level detector output goes "true." The two "true" outputs are then logically "ORed."

For example, for the signal shown, the first variable exceeds the −6 v. level and a true signal is generated. The seventh variable is less than −2 volts so a second signal is generated.

The inhibit switch is connected to sine wave generator 30 which is connected to mixer 8. The mixer is connected between vertical sweep generator 6 and the CRT. The inhibit switch, also referred to as a visual cue switch, is believed to be a standard circuit for use with CRT. The vertical generator, mixer and sine wave generator are also believed well known to those skilled in the art. As a result, specific embodiments for the circuits are not illustrated and described in detail.

The vertical sweep generator is connected to receive input signals from decoder 22. Each time an input is received, a step function output signal to the mixer increases by one step (stairstep waveform) in the vertical direction. An example of the signal is shown at the output of the vertical sweep generator.

The signal increases for eight steps and then repeats the sequence. The high frequency signal generated by sine wave generator 30 is mixed, or superimposed, on the vertical stairstep signal so that the display associated with each step has a height which is a function of the magnitude of the sine wave. Since the frequency is relatively high, the bar display during each interval appears to be continuous. However, when a signal is out of tolerance, the inhibit switch inhibits the sine wave signal during that interval so that the display is represented by a straight line instead of a bar under normal conditions. For example, if an abnormal variable is detected by comparator 21, the output signal generated by the comparator is referenced to a particular variable. The output signal triggers the inhibit switch to prevent mixing of the sine wave with the inhibit step function signal of the sweep generator during the period of the output signal. As a result, for that interval, the display for that variable changes from a bar graph display to a straight line display. The horizontal magnitude of the variable displayed is controlled by the horizontal sweep generator.

The comparator logic for interrupt control comprises variable multiplexing logic 15 connected to receiver 32 inputs from the buffer. An additional input is received from decoder 7. The decoder input comprises a gating signal for gating through samples of the variables (multiplexing) to high/low comparator 17. For example, during each true interval of the gating signal, a voltage level representing the magnitude of a variable for that period is gated to the comparator.

The variable multiplexing logic may be mechanized by 32 AND gates. Each AND gate has an input connected to receive one of the thirty-two variables and a gating signal generated by decoder 7. The AND gates have a common multiplexed output connected to high/low comparator 17.

Decoder 7 is connected to five bit counter 5 which is connected to clock 20. The decoder may be comprised of thirty-two AND gates for logically combining (decoding) outputs from the 5 bit counter. The thirty-two AND gates generate thirty-two signals having true intervals corresponding to a count of thirty-two by the 5 bit counter. For example, a true signal output from a first gate of the decoder would gate a first variable through the multiplexing logic. The gating is continued for thirty-two intervals and then repeated.

The 5 bit counter may be mechanized by circuits well known in the art comprising five flip flops and appropriate gates for counting thirty-two binary intervals in response to signals from clock 20.

Signals from clock 20 have a relatively higher frequency than signals from clock 72 so that counter 4 counts at a substantially slower rate than counter 5. The difference in counting rates is important because an abnormal variable can be detected before any variables are gated through multiplexing logic 14.

The high/low comparator is connected to unit reference logic 12. It may comprise two direct coupled differential amplifiers having their outputs connected together. The amplifiers are biased as previously indicated in connection with comparator 21 so that if input signal is either high or low relative to the limits, an output signal is generated.

The unit reference logic is connected to interrupt control logic 18 and has inputs from decoder 19. Decoder 19 is connected to counter 5. The unit reference logic can be mechanized by four AND gates having a common input connected to comparator 17 and having individual inputs connected to receive signals from decoder 19. The outputs identify a particular unit of variables when a variable becomes abnormal.

Decoder 19 comprises four AND gates connected to receive outputs from counter 5. For example, one AND gate may receive signals from flip flops mechanizing the counter during eight binary intervals. During that period of time, the AND gate would have a true interval. That true interval corresponds to one of the four units to which the variables are referenced. During the next eight intervals, a second AND gate would provide a true signal. The sequence would be continued until signals having four true intervals corresponding to the selected units were generated at which time the sequence would be repeated. The four signals generated by decoder 19 are in effect a submultiple of the signals generated by decoder 7 and decoder 22.

Therefore, if an abnormal variable is detected, it will be referenced to a particular unit when it is gated through referencing logic 12.

The interrupt control logic is connected to counter 4 and includes a reset input for resetting its outputs after an abnormal variable has been indicated. The logic may be mechanized by four flip flops. Each of the four flip flops have inputs connected to one of the four AND gates of the reference logic. Initially, all flip flops are set to a false state. If an abnormal variable is detected, the flip flop corresponding to the unit in which the variable is detected is set true. Each flip flop of the interrupt control logic has a true and false output connected to counter 4. The individual flip flops comprising the logic may be designated as interrupt control (IC) flip flops. For example, the flip flop which generates an interrupt, or override, signal corresponding to unit one, may be designated as $IC_1$. Other flip flops may be similarly designated as $IC_2$, $IC_3$ and $IC_4$. Signals from the flip flops interrupt normal sequencing and pre-empt the unit display to that unit display containing an abnormal variable.

FIGURE 2 shows a display of the eight variables comprising unit #2. The designation of pressure ratio, engine pressure, fuel flow, etc. may be part of an overlay for the CRT. The overlay designates the low (L), normal (N) and high (H) limits for the variables. The four engine numbers correspond to the four units of variables processed by the system. Since each engine had eight critical parameters that required monitoring, eight variables were referenced to one unit. Unit #1 corresponds to engine #1. Unit #2 corresponds to engine #2, etc. Additional indicator means 70 such as a panel with lights could be connected to the outputs of decoder 57 to identify the units. An operator viewing the display can easily determine whether or not the parameters are within normal limits.

FIGURE 3 shows a display of eight variables comprising unit #4 (engine #4) in which two variables are outside the predetermined limits. The pressure ratio and fluid flow parameters were detected as abnormal variables by comparator logic 17 which initiated the display of unit #4, and by comparator logic 21. As previously indicated, the sinusoidal generator was inhibited from being mixed with the signal produced by the vertical sweep generator during the second and eighth intervals of the unit #4. As a result, the bar graph representation for the variables changed to the straight line representation shown.

Figure 6:
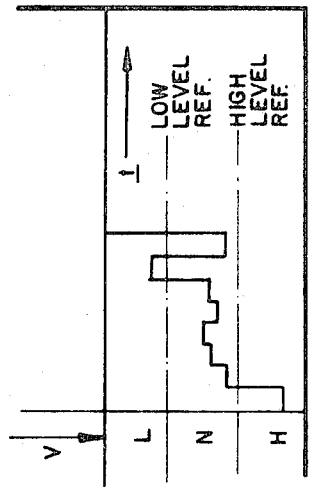
FIGURE 6 illustrates an example of a sequence of voltage levels representing a particular unit having abnormal variables.
Figure 5:
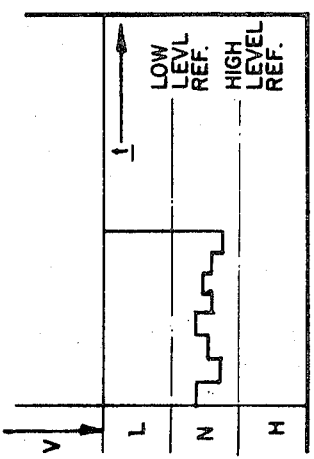
FIGURE 5 illustrates an example of a sequence of voltage levels representing normal variables of a particular unit.

FIGURES 5 and 6 show voltage levels taken at the output of the variable sequencing logic. The particular levels shown correspond to the display illustrated in FIGURES 2 and 3 for units #2 and #4. The voltage levels are shown as negative levels although in a particular system, the magnitudes could be positive instead of negative. The levels are placed in series, or multiplexed, as shown, by the gating action of the signals from decoder 22. All the parameters of FIGURE 5 are within normal limits. The FIGURE 6 signals for unit #4, show two abnormal variables.

Figure 4:
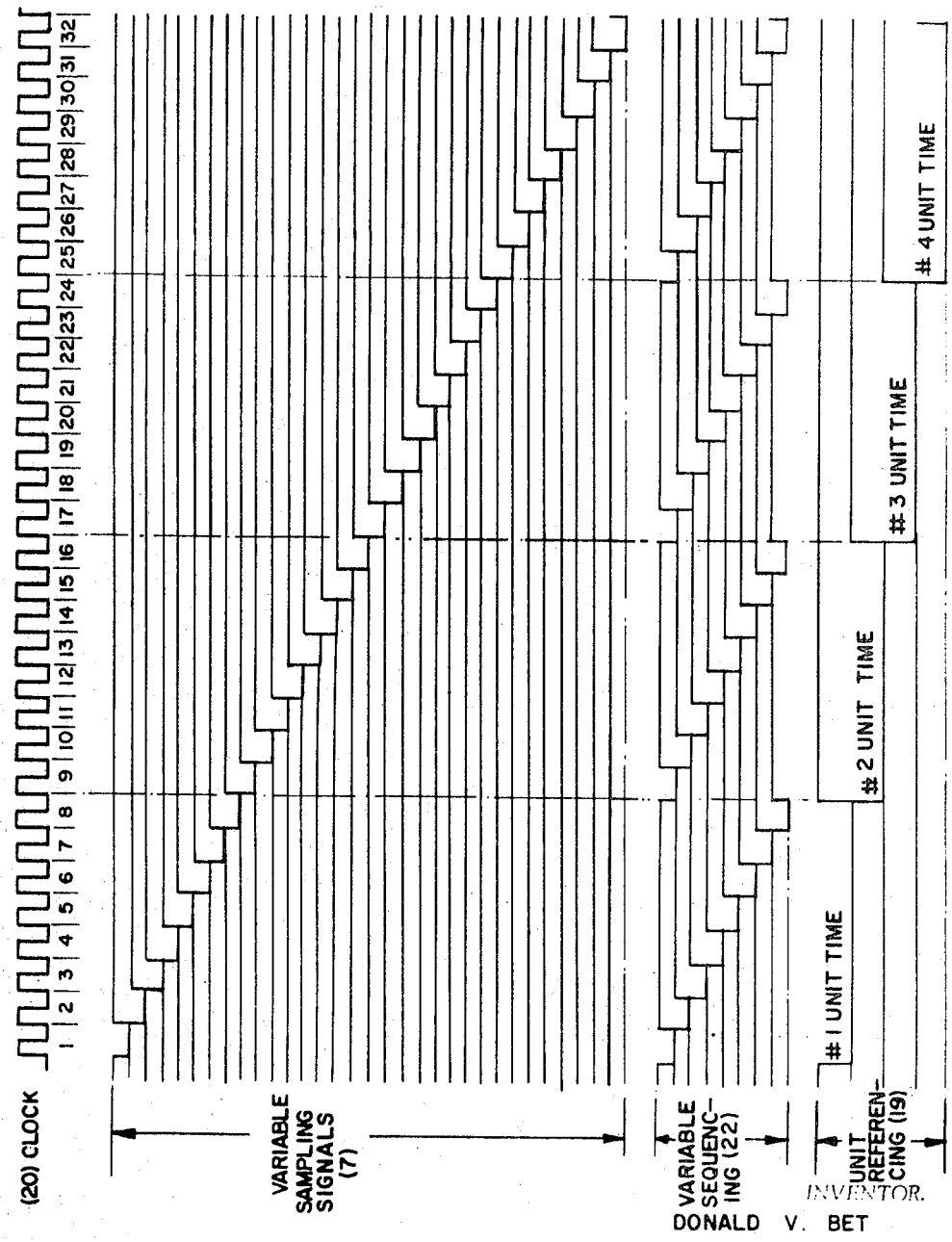
FIGURE 4 shows a plurality of gating signals for regulating the system.

FIGURE 4 shows the signals generated by decoder 7, 19 and 22 in response to the binary count in counter 5. The signals from all the decoders and clock 20 are combined in FIGURE 4 for convenience in showing the relationship between all the gating signals. The count in bit counter 5 corresponds to the numbers shown with the clock signal.

The variable sampling signals from decoder 7 gate the variables through multiplexing logic 15 in thirty-two intervals corresponding to the thirty-two input variables. If the number of variables changes, the multiplexing interval for each variable would be changed proportionately. The rate of the signal generated by clock 20 could be increased or decreased to change the rate at which the variables are gated through logic 15.

One gate of decoder 7 is true for one bit time out of thirty-two bit times shown for the clock. In other words, each of the thirty-two gates of the decoder has one true interval out of the thirty-two intervals. Otherwise, samplings of the variables would be gated through during each true interval.

The variable sequencing logic comprises eight signals. Each signal corresponds to one variable. Since the counter counts up to 32, decoder 22 can generate its eight signals by using the first eight counts developed by the counter. As shown in the figure, each of the eight signals has one true interval every eight counts. For example, the first signal of the group has a true interval at time 1, time 9, time 17 and time 25. During each true interval, a variable is gated through the variable sequencing logic into the horizontal sweep generator and comparator 21. Each gate of sequencing logic 16 has an input connected to receive one of the sequencing signals. Also during each true interval, the vertical sweep generator increases by one step until an increase of eight steps is completed whereupon it recycles.

The unit referencing logic comprises four signals with each having a true interval of eight clock periods. Each AND gate of the unit referencing logic is connected to receive one of the gating signals. This logic identifies an abnormal variable to one of four variable units.

As previously indicated, the signal generated by clock 20 has a frequency which is substantially higher than the frequency of clock 72. For example, clock 72 may have a frequency of one cycle per second. The frequency of clock 20 may be 5,000 cycles per second. As a result, the 32 variables of the present embodiment can be gated through the variable monitoring logic and compared with high and low limits before counter 4 has counted a binary one for gating unit #1 through the unit multiplexing logic. Therefore, if a variable is determined to be abnormal in unit #4, counter 4 would be set to a count of 4 for gating unit #4 through the unit multiplexing logic 14 immediately.

Figure 7:
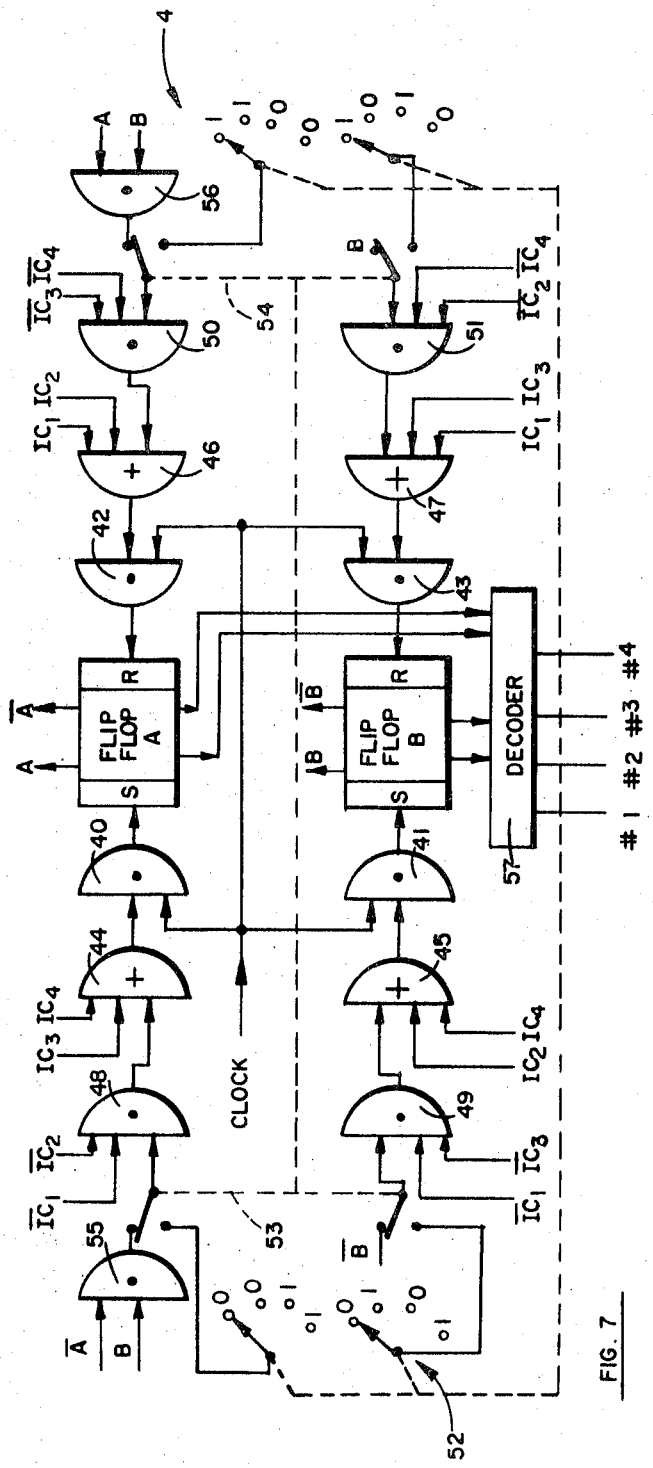
FIGURE 7 illustrates one embodiment of a counter circuit for gating groups of variables to a display.

Referring now to FIGURE 7, wherein is shown one example of a counter which can be used as logic counter 4. Flip flops A and B generate the count by being "set" and "reset" as a function of input signals from gates 40 and 41 on the set (S) side and gates 42 and 43 on the reset (R) side. The flip flops may be standard R-S flip flops. Gates 40 through 43 are AND gates so that the input from clock 72 as well as the inputs from OR gates 44 through 47, must be true before a set or reset signal can be generated. Gates 44 and 45 are connected to gates 40 and 41, respectively. Gates 46 and 47 are connected to gates 42 and 43, respectively.

Each OR gate has three inputs. Any one of the inputs produces an output which can be used to set the logical state of the flip flops. Inputs $IC_3$ and $IC_4$ to gate 44 are derived from the interrupt control logic. If an abnormal variable is detected during the third or fourth unit time interval, the interrupt control signal for that interval becomes true. At all other times the signal remains false. Similar inputs, $IC_2$ and $IC_4$ are connected to gate 45.

Gates 46 and 47 have inputs from the interrupt logic comprising $IC_1$, $IC_2$, and $IC_1$ and $IC_3$, respectively.

The third input to each OR gate is derived from AND gates 48, 49, 50 and 51 as shown. For example, if all inputs to gate 48 are true, an output signal is generated to gate 44. Inputs for the AND gates may be manually controlled by changing the position of switch means 52. Assuming that each switch position is connected to a voltage level corresponding to a logical state, each time the switch position changes the count changes. Since it is manual, the count and therefore the display controlled by the counter, can be held for an indefinite period.

In the alternative, and during a normal operating cycle, switches 53 and 54 are placed in an automatic position so that the count repeats automatically. The flip flop outputs are connected as inputs to AND gates 49, 51, 55 and 56 to produce the automatic count.

Logic for the counter with interrupt control is shown as follows:

$$S_a = \overline{AB}\overline{IC_1}\overline{IC_2} + IC_3 + IC_4$$
$$S_b = B\overline{IC_1}\overline{IC_3} + IC_2 + IC_4$$
$$R_a = AB\overline{IC_3}\overline{IC_4} + IC_2 + IC_1$$
$$R_b = B\overline{IC_2}IC_4 + IC_1 + IC_3$$

where $S_a$ and $S_b$ represent the "set" inputs to flip flops A and B and B and $R_a$ and $R_b$ represent the "reset" inputs to flip flops A and B.

The flip flop outputs, A, $\overline{A}$, B, $\overline{B}$ are appropriately connected together by, for example, AND gates for producing decoded signals 57 representing the count. Output #1 corresponds to a decoded binary count of one for unit #1. Output #2 corresponds to a decoded binary count of two for unit #2. The other outputs correspond to decoded counts three and four for units #3 and #4.

The counting sequence is shown in the following truth table:

| Set-reset inputs | | | | Outputs | | |
| --- | --- | --- | --- | --- | --- | --- |
| $S_a$ | $S_b$ | $R_a$ | $R_b$ | A | B | Unit No.[1] |
| 0 | 0 | 1 | 1 | 0 | 0 | 1 |
| 0 | 1 | 1 | 0 | 0 | 1 | 2 |
| 1 | 0 | 0 | 1 | 1 | 0 | 3 |
| 1 | 1 | 0 | 0 | 1 | 1 | 4 |

[1] From the decoder.

As shown by the table, when A and B are both false, a decoded signal is generated for gating a first gating a first plurality of variables in the unit multiplexing 14.

The first signal remains true until signals representing the variables of unit #1 have been gated through the logic. The second signal becomes true immediately after the first. The sequence continues until all the units have been gated through the logic. Afterwards, the sequence is repeated at a relatively slow rate controlled by the clock 12.

If, however, an abnormal variable is detected by comparator 16, for example, in group #3, the $IC_3$ control signal interrupts the normal sequence. Flip flop A is "one" set and flip flop B is "zero" set to produce a binary count of three. The interrupt control signals "override" other input signals to the counter.

In operation, the 32 variables are coupled through the buffer stage to the unit multiplexing logic and to the variable multiplexing logic. The variables are represented by relatively constant voltage levels as contrasted with sinusoidal signals. During each true interval of the individual gating signals generated by decoder 7, a variable voltage level is gated to comparator 16 and is compared with high/low limits. All the variables are gated into the comparator and tested before the first count can be developed by counter 4.

So long as the variables are within limits defined by the comparator, no override control output signal is generated. However, if an abnormal variable is detected, for example, variable 26, an output signal is generated by the comparator. Although decoder 19 is continuously gating the unit referencing logic, until a signal is received from comparator 1, no output is gated into the control logic. During the time interval of variable 26, the signal generated by decoder 19 gates variable #26 to the flip flop #4 of the interrupt logic. The particular signal generated by decoder 19 would correspond to unit #4 and would cover the interval between $T_{25}$ and $T_{32}$ as shown in FIGURE 4. Prior to receiving the input signal, all the "prime" output lines of the interrupt control logic were true. The input signal causes the $IC_4$ line to become true. Counter 4 is forced to a binary count of four. The "four" count is decoded into a gating signal referenced to unit #4 in 14 so that the eight variables assigned to unit #4 are gated through logic 14 simultaneously to the sequential logic 16. When the interrupt control logic is reset the counter resumes its normal counting sequence. The eight variables of unit #4 are gated in series from the sequential logic simultaneously into the horizontal sweep generator and into high/low comparator 21.

The abnormal variable is again detected by the second comparator. During time interval 26, the relatively high frequency sine wave generated by sine wave generator 30 is inhibited from being superimposed on the vertical portion of the step function generated by the vertical sweep generator. The inhibitor switch is triggered by the signal from the second comparator.

The height of each bar comprising the display is determined by the presence or absence of the sine wave. Therefore, the display of abnormal variable 26, which for example is assumed to be low, would be within the (L) or low range of the display and would be represented by a straight line.

The horizontal displacement is controlled by the magnitude of the ramp signal generated by the horizontal sweep generator.

Although the invention has been described and illustrated in detail, it is to be understood that the same is by way of illustration and example only, and is not to be taken by way of limitation; the spirit and scope of this invention being limited only by the terms of the appended claims.

I claim:

1. A system for generating displays of normal and abnormal variables comprising,
   means for displaying the variables in a form representing the quantity of the variables,
   means for dividing said variables into units comprising at least one variable, first means for gating said means for dividing at a relatively slow rate,
   first compare means responsive to the variables of said units for generating a signal if an abnormal variable is detected, including means responsive to said signal for changing the form of display of said abnormal variable,
   second compare means for generating a signal if a variable is determined to be abnormal, including third means for generating a control signal referenced to a unit if an abnormal variable is detected, said second compare means being gated at a rate faster than the rate at which said means for dividing is gated, whereby any abnormal variable can be detected before the variables are divided into units, and compared by said first compare means,
   said first means for gating being responsive to said control signal for immediately gating the unit containing the abnormal variable through the means for dividing.

2. The combination as recited in claim 1, including means for simultaneously providing said variables as inputs to the means for dividing and the second compare means.

3. The combination as recited in claim 1, wherein said means for dividing includes means for generating simultaneous outputs comprising all of the variables of a unit in response to the first means for gating, said means for gating including means for gating said units sequentially through the means for dividing until an abnormal variable is detected by said second compare means, means for gating said outputs in series to said first compare means and to said means for displaying, and said first means for gating includes means responsive (A, B) to said control signal for interrupting the sequential gating of units through said means for dividing and for restoring the sequential gating of units after said means for dividing is gated in response to the control signal.

4. The combination as recited in claim 1, wherein said means for displaying includes horizontal and vertical control means, said horizontal control means being responsive to the quantity of the variables of a unit for generating a horizontal display proportional to said quantity, said vertical control means comprising means for generating a vertical display comprising all of the variables of a unit, including means responsive to said first compare means for changing the form of display of a variable determined to be abnormal.

5. The combination as recited in claim 1, including second gating means for gating said second compare means and third gating means for generating a clock signal having a rate which is a submultiple of the rate of said second gating means, said clock signal having a plurality of logically true intervals with each interval representing one of said units, said second compare means including means for referencing an abnormal variable to a unit, said means being gated by said third means whereby when an abnormal variable is gated through said means for referencing, it is referenced to a particular unit.

References Cited
UNITED STATES PATENTS

| | | | |
|---|---|---|---|
| 3,248,650 | 4/1966 | Bialkowski et al. | 340—324 |
| 3,324,458 | 6/1967 | MacArthur | 340—324 |
| 3,375,509 | 3/1968 | Mullarkey | 340—324 |
| 3,387,084 | 6/1968 | Kine et al. | 340—324 |

JOHN W. CALDWELL, Primary Examiner

M. M. CURTIS, Assistant Examiner